US008954882B2

(12) United States Patent
Miyoshi et al.

(10) Patent No.: US 8,954,882 B2
(45) Date of Patent: Feb. 10, 2015

(54) RECORDING MEDIUM STORING INFORMATION PROCESSING PROGRAM, INFORMATION PROCESSING DEVICE, INFORMATION PROCESSING SYSTEM, AND INFORMATION PROCESSING METHOD

(75) Inventors: Yasumasa Miyoshi, Kyoto (JP); Kiyofumi Funahashi, Kyoto (JP); Hiroki Takuma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 128 days.

(21) Appl. No.: 13/438,485

(22) Filed: Apr. 3, 2012

(65) Prior Publication Data

US 2013/0111397 A1 May 2, 2013

(30) Foreign Application Priority Data

Oct. 28, 2011 (JP) ................................. 2011-237096

(51) Int. Cl.
*G06F 3/0485* (2013.01)
*G06F 3/0488* (2013.01)
*G06F 17/30* (2006.01)
*G06F 3/01* (2006.01)

(52) U.S. Cl.
CPC .... *G06F 3/0485* (2013.01); *G06F 2203/04808* (2013.01); *G06F 3/0488* (2013.01); *G06F 3/017* (2013.01); *G06F 2203/04806* (2013.01); *G06F 3/04883* (2013.01); *G06F 17/30905* (2013.01); *Y10S 715/973* (2013.01)
USPC ........... 715/784; 715/788; 715/800; 715/973; 345/173; 345/179

(58) Field of Classification Search
CPC . G06F 3/0485; G06F 3/0488; G06F 3/04883; G06F 3/017; G06F 2203/04806; G06F 2203/04808; G06F 17/30905
USPC ........... 715/784, 973, 788, 800; 345/173, 179
See application file for complete search history.

(56) References Cited

U.S. PATENT DOCUMENTS

| 7,479,949 | B2 * | 1/2009 | Jobs et al. ...................... 345/173 |
| 8,082,518 | B2 * | 12/2011 | Flake et al. ................... 715/786 |
| 2006/0048073 | A1 * | 3/2006 | Jarrett et al. .................. 715/784 |
| 2010/0192066 | A1 * | 7/2010 | Wu ................................ 715/727 |
| 2012/0026201 | A1 * | 2/2012 | Amano ......................... 345/661 |
| 2012/0042278 | A1 * | 2/2012 | Vaisanen ....................... 715/786 |
| 2012/0066621 | A1 * | 3/2012 | Matsubara .................... 715/764 |
| 2012/0066627 | A1 * | 3/2012 | Furukawa et al. ............ 715/768 |
| 2012/0066644 | A1 * | 3/2012 | Mizutani et al. .............. 715/810 |
| 2012/0206495 | A1 * | 8/2012 | Endo et al. .................... 345/661 |
| 2012/0274662 | A1 * | 11/2012 | Kim et al. ..................... 345/650 |

FOREIGN PATENT DOCUMENTS

JP 2010-198298 9/2010

* cited by examiner

*Primary Examiner* — Ting Lee
(74) *Attorney, Agent, or Firm* — Nixon & Vanderhye P.C.

(57) ABSTRACT

An example information processing device includes an information processing unit which scrolls a screen of a display unit on which a web page is displayed, in response to a flick gesture or operation, and during flick scroll, reduces the web page in size and displays a portion of the web page reduced in size on the screen of the display unit.

16 Claims, 8 Drawing Sheets

F I G. 2
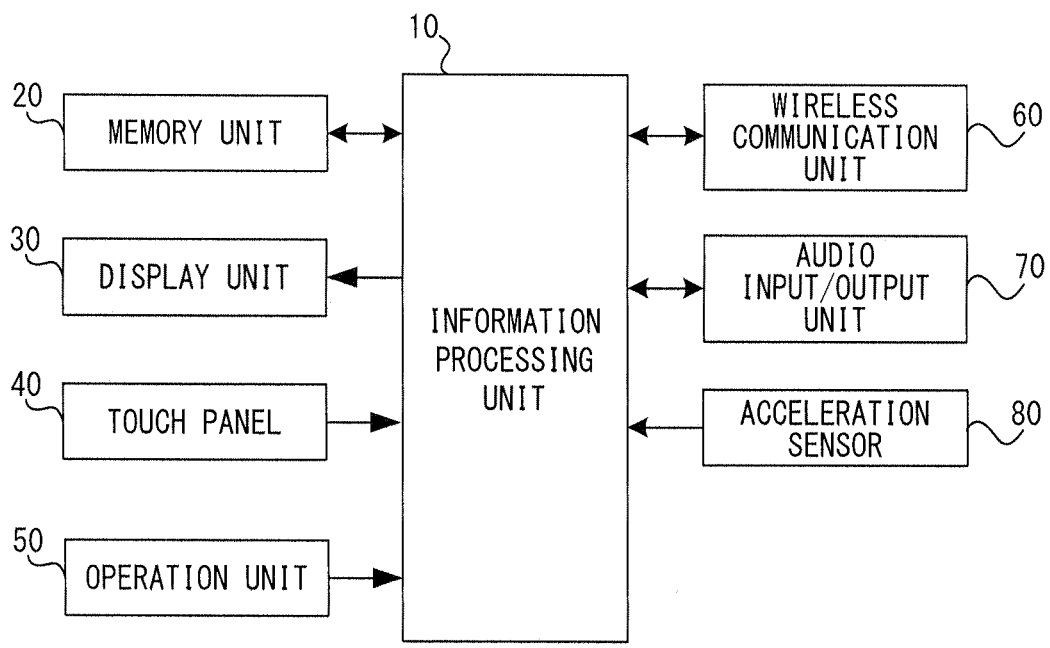

RECORDING MEDIUM STORING INFORMATION PROCESSING PROGRAM, INFORMATION PROCESSING DEVICE, INFORMATION PROCESSING SYSTEM, AND INFORMATION PROCESSING METHOD

CROSS REFERENCE TO RELATED APPLICATION

The disclosure of Japanese Patent Application No. 2011-237096, filed Oct. 28, 2011, is incorporated herein by reference.

FIELD

The technology disclosed herein relates to recording media storing information processing programs, information processing devices, information processing systems, and information processing methods which are used to display content on a display unit.

BACKGROUND AND SUMMARY

Conventionally, there is a known information processing device which scrolls the screen of a display unit on which content is displayed, in response to a user's input to a touch panel.

In the conventional information processing device, a scroll operation needs to be repeatedly performed in order to allow a user to view a portion of content that is located away from the currently displayed portion.

Therefore, it is an object of the present exemplary embodiment to provide, for example, a recording medium storing an information processing program which allows a user to more quickly view a desired portion of content.

In order to achieve the object, exemplary embodiments have configurations as follows.

An exemplary embodiment is a computer-readable recording medium storing an information processing program which causes a computer of an information processing device to execute scrolling a screen of a display unit on which content is displayed, reducing the content in size so that the content having at least a portion reduced in size in a direction of the scrolling is displayed on the screen when the scrolling is being performed, and displaying the at least a portion reduced in size of the content on the screen.

With this configuration, when the screen is being scrolled, the content is reduced in size in the direction of the scrolling, whereby a portion of the content located outside the screen can be more quickly displayed. Therefore, a user is allowed to more quickly view a desired portion of the content.

The screen may be scrolled by a scroll amount per predetermined time on the screen, the scroll amount per predetermined time being substantially not changed, irrespective of whether or not the content is reduced in size.

With this configuration, the scroll amount per predetermined time is not changed, irrespective of whether or not the content is reduced in size. Therefore, visibility to a user can be improved.

In the computer-readable recording medium, the information processing program may cause the computer to further execute detecting a strength of an input performed by a user in response to the user's input. In this case, the content may be reduced in size based on a result of the strength detection.

With this configuration, the content is reduced in size based on the strength of the user's input. Therefore, the content can be displayed in a manner which satisfies the user's intention reflected on an input made by the user who desires to more quickly view the content after scrolling.

In the computer-readable recording medium, the information processing program may cause the computer to further execute obtaining a position group on a predetermined input surface in response to the user's input. In this case, the strength of the user's input may be detected based on the obtained position group.

With this configuration, the strength of the user's input is detected based on the user's input to the predetermined input surface. Therefore, the content can be displayed in a manner which satisfies the user's intention.

The content may be reduced in size at a ratio which increases with an increase in the detected strength.

With this configuration, the ratio at which the content is reduced in size increases with an increase in the strength of the user's input. Therefore, the content can be displayed in a manner which satisfies the user's intention.

The screen may be scrolled based on the obtained position group.

With this configuration, the screen is scrolled based on the position group which is used to reduce the content in size. Therefore, the user's operation can be prevented from becoming complicated.

In the computer-readable recording medium, the information processing program may cause the computer to further execute calculating, based on the obtained position group, a touch area indicating an area of a touched region of the input surface. The strength of the user's input may be detected based on the touch area.

With this configuration, the strength of the user's input may be detected based on the area of a touched region of the input surface. Therefore, the content can be displayed in a manner which satisfies the user's intention.

In the computer-readable recording medium, the information processing program may cause the computer to further execute calculating, based on the obtained position group, a movement speed indicating a distance per predetermined time by which a touched region of the input surface has been moved. The strength of the user's input may be detected based on the movement speed.

With this configuration, the strength of the user's input is detected based on the movement speed of a touched region of the input surface. Therefore, the content can be displayed in a manner which satisfies the user's intention.

The screen may be scrolled in response to a user's instruction to an operation unit, and the content may be reduced in size in response to the instruction.

In the computer-readable recording medium, the information processing program may cause the computer to further execute, when the scroll is ended, returning a reduced size of the content to an original size thereof as it was before being reduced.

With this configuration, when scrolling is ended, a portion of the content desired by the user is displayed. Here, the size of the content is returned to its original size as it was before being reduced, whereby the user is allowed to view the desired content.

In the computer-readable recording medium, the information processing program may cause the computer to further execute obtaining a position group on a predetermined input surface in response to a user's input, and identifying a first operation in which the position group continues to be obtained and varies or a second operation in which the obtained position group varies within a predetermined period of time before being not obtained. In this case, when the first operation is performed, the screen may be scrolled based on the position group relating to the first operation, and when the second operation is performed, the screen may be scrolled based on the position group relating to the second operation. When the first operation is performed, the content may not be reduced in size, and when the second operation is performed, the content may be reduced in size.

With this configuration, the screen is only scrolled, or not only scrolled but also reduced in size, depending on the manner in which the user performs an input operation.

When the second operation is performed, the content may be reduced at a reduction ratio which is determined based on the position group relating to the second operation.

With this configuration, the reduction ratio relates to the second operation. Therefore, the content can be displayed in a manner which satisfies the user's intention.

The reduction ratio may not be changed until a predetermined period of time has elapsed since the start of the second operation.

With this configuration, when the second operation is repeatedly performed, the size of the content is prevented from being frequently changed. Therefore, visibility to the user can be improved.

According to the present exemplary embodiment, a user is allowed to more quickly view a desired portion of the content without performing a complicated operation.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 2 is a block diagram showing an internal configuration of an example non-limiting information processing device;

DESCRIPTION OF NON-LIMITING EXAMPLE EMBODIMENTS (Configuration of Information Processing Device)

Figure 1:
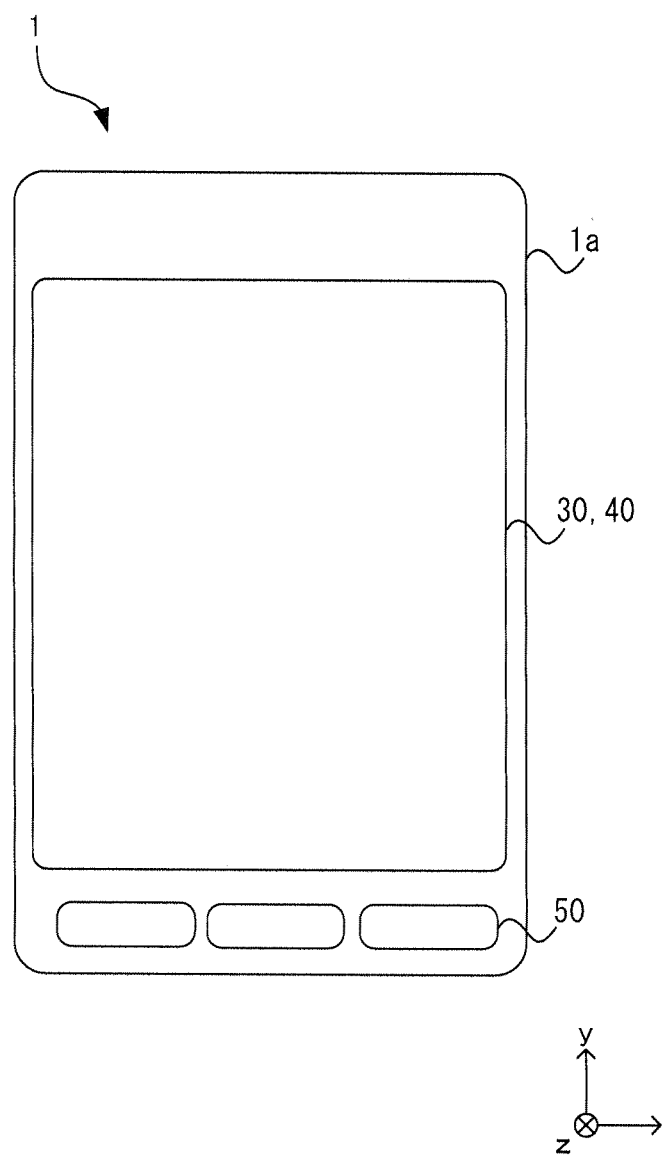
FIG. 1 is a diagram showing an external appearance of an example non-limiting information processing device.

FIG. 1 is a diagram showing an external appearance of an information processing device according to an embodiment.

As shown in FIG. 1, an information processing device 1 is a mobile information processing device including a housing 1a, a display unit 30, a touch panel 40, and an operation unit 50.

The housing 1a is sized to be grasped by a single hand of a user of the information processing device 1. The display unit 30 is provided in the housing 1a. A front surface of the display unit 30 is covered by the touch panel 40. The operation unit 50 is also provided in the housing 1a. The display unit 30, the touch panel 40, and the operation unit 50 will be described in detail below.

(Internal Configuration of Information Processing Device)

FIG. 2 is a block diagram showing an internal configuration of the information processing device of the embodiment.

As shown in FIG. 2, the information processing device 1 includes an information processing unit 10, a memory unit 20, the display unit 30, the touch panel 40, the operation unit 50, a wireless communication unit 60, an audio input/output unit 70, and an acceleration sensor 80.

The information processing unit 10 reads an information processing program stored in the memory unit 20, and executes the information processing program to execute an information process described below. The information processing unit 10 includes, for example, a central processing unit (CPU).

The memory unit 20 stores, for example, an information processing program which is executed by the information processing unit 10, image data which is displayed on the display unit 30, audio data which is output from the audio input/output unit 70, and information which is input from the touch panel 40, the operation unit 50, the wireless communication unit 60, the audio input/output unit 70, and the acceleration sensor 80. The memory unit 20 may include, for example, a random access memory (RAM), a read only memory (ROM), etc.

The display unit 30 displays an image which is generated by the information processing unit 10 executing an information processing program and an image which is downloaded from a website on the Internet via the wireless communication unit 60. The display unit 30 includes, for example, a liquid crystal display (LCD).

The touch panel 40 obtains information about a touch position or a touch area at predetermined time intervals and outputs the information to the information processing unit 10 when a user touches the information processing device 1 using a finger, a pen, etc. The touch panel 40 includes, for example, a capacitive touch panel. The touch panel 40 can simultaneously detect a plurality of points which are spaced apart from each other by a predetermined spacing on the touch panel 40. When a finger touches the touch panel 40, a plurality of positions (position group) are simultaneously detected and output to the information processing unit 10, because the touch area of the finger is typically much larger than the predetermined spacing. Note that the touch panel 40 covers the display unit 30, and therefore, a position on the touch panel 40 which is detected by the touch panel 40 is assumed to be a position on the screen of the display unit 30 for the sake of convenience. The information processing unit 10 temporarily stores the detected position in the memory unit 20.

As shown in FIG. 1, the touch panel 40 is in the shape of a rectangle. A direction parallel to a side of the rectangle is referred to as an X-axis, and a side adjacent to that side is referred to as a Y-axis. A touch position is, for example, represented by an X-coordinate and a Y-coordinate. The X-coordinate is obtained by calculating a center position between a position having a greatest X-value and a position having a smallest X-value of all positions included in a touch area. The Y-coordinate is obtained by calculating a center position between a position having a greatest Y-value and a position having a smallest Y-value of all positions included in the touch area.

A touch area is, for example, calculated as the area of an ellipse. The length of the minor (or major) axis of the ellipse is obtained by calculating the difference between a greatest value and a smallest value of the X-values of all positions included in the touch area. The length of the major (or minor) axis of the ellipse is obtained by calculating the difference between a greatest value and a smallest value of the Y-values of all positions included in the touch area.

The operation unit 50 obtains operation information corresponding to a user's operation and outputs the operation information to the information processing unit 10. The operation unit 50 includes, for example, an operation button which can be pressed down by a user.

The wireless communication unit 60 transmits information from the information processing unit 10 to a server on the Internet or another information processing device, and transmits information from a server on the Internet or another information processing device to the information processing unit 10. The wireless communication unit 60 includes, for example, a module having a function of connecting to a wireless LAN using a scheme conforming to the standard IEEE802.11.b/g.

The audio input/output unit 70 outputs a sound represented by audio data which is read from the memory unit 20 by the information processing unit 10, and outputs, to the information processing unit 10, audio data which represents a sound externally input to the information processing device 1. The audio input/output unit 70 includes, for example, a microphone and a loudspeaker.

The acceleration sensor 80 detects accelerations along three axial directions (X-, Y-, and Z-axis directions) of FIG. 1, and outputs acceleration data representing the detected accelerations to the information processing unit 10.

(General Description of Display Process of this Embodiment)

A general description of a process of displaying content on the display unit 30 of the information processing device 1 will be given hereinafter. In the information processing device 1, the content display process is performed by the information processing unit 10 executing an information processing program stored in the memory unit 20.

Figure 3:
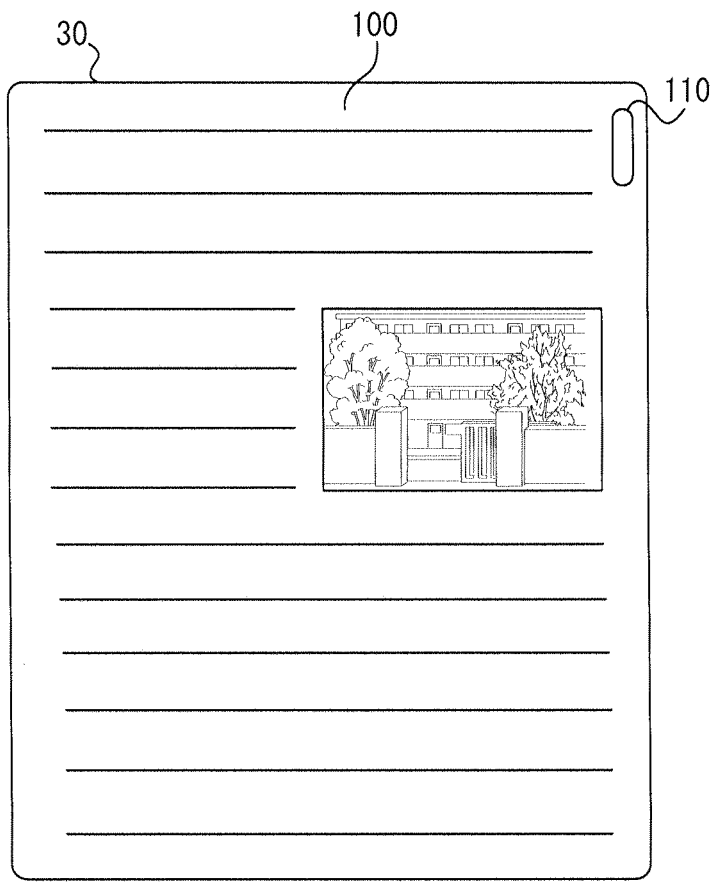
FIG. 3 is a diagram for describing scrolling of an example non-limiting web page.
Figure 4:
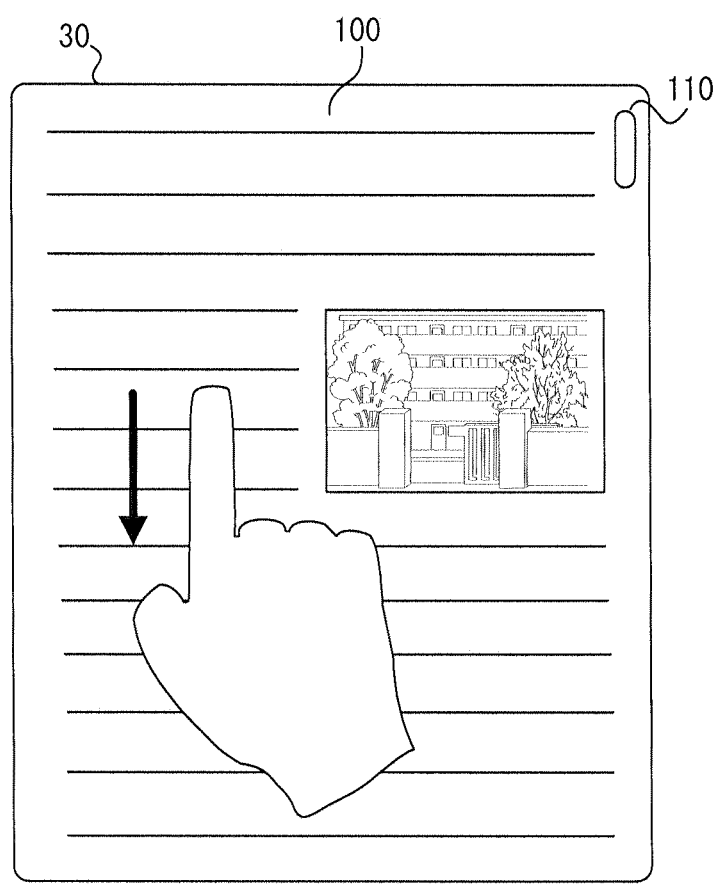
FIG. 4 is a diagram for describing scrolling of an example non-limiting web page.
Figure 5:
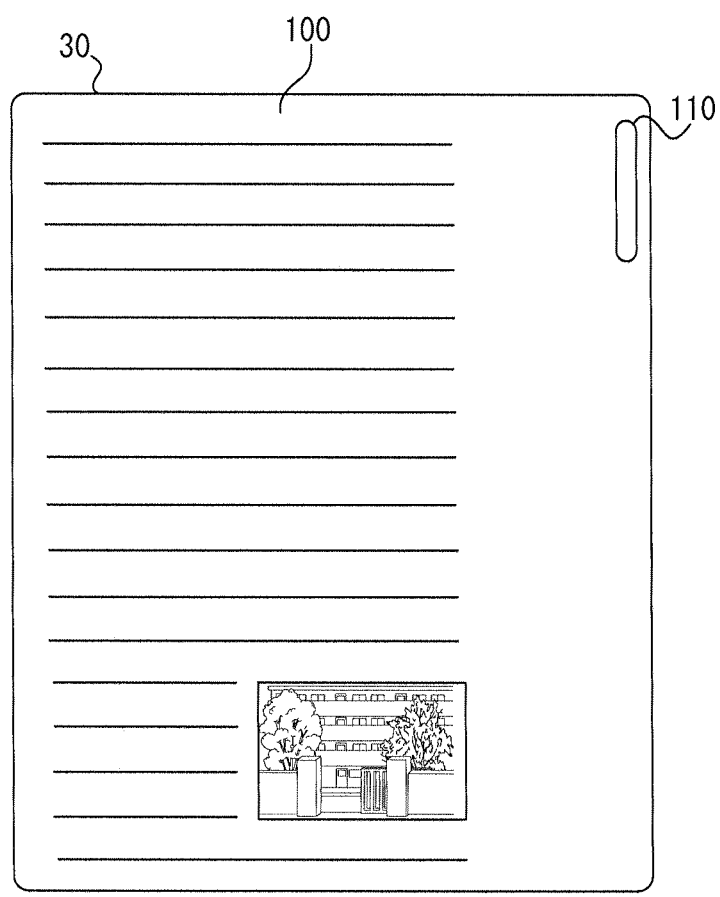
FIG. 5 is a diagram for describing scrolling of an example non-limiting web page.

FIGS. 3-5 are diagrams for describing scrolling of a web page (content). As shown in FIG. 3, a web page 100 containing an HTML document, an image, etc. is displayed on the display unit 30. The web page 100 is content larger than the display region of the display unit 30, and therefore, only a portion of the web page 100 is displayed on the display unit 30 at a time. Therefore, in order to display a portion of the web page 100 which is not currently displayed on the display unit 30, a user of the information processing device 1 touches the touch panel 40 using a finger to perform a gesture or operation that the finger is slid in any of up, down, left, and right directions while keeping touching the touch panel 40, within a predetermined period of time, before being moved or touched off the touch panel 40. In other words, a user flicks the touch panel 40 using a finger (flick gesture). In this case, the initial speed of scrolling is determined based on a change amount of touch position immediately before the finger is moved off the touch panel 40, and then the screen of the display unit 30 is scrolled (hereinafter referred to as "flick scroll"). During flick scroll, predetermined frictional force is applied in a direction opposite to a scroll direction, so that the scroll speed is attenuated over time before the flick scroll is eventually stopped.

The display unit 30 also displays a scroll indicator 110 for allowing a user to recognize which portion of the web page 100 is currently displayed. A length in a vertical direction of the scroll indicator 110 varies depending on the ratio of the length in the vertical direction of a portion of the web page 100 that is currently displayed on the display unit 30 to the length in the vertical direction of the entire web page 100.

As shown in FIG. 4, when a web page is displayed on the display unit 30, if a user touches the touch panel 40 using a finger, the touch panel 40 detects a position group on the screen of the display unit 30 at predetermined time intervals, and outputs the position group to the information processing unit 10. In other words, the information processing unit 10 obtains a position group on the screen of the display unit 30 based on a user's input. In this case, the information processing unit 10 calculates, based on the obtained position group on the screen of the display unit 30, a touch center position indicating a center position of a region in which the finger touches the touch panel 40 and a touch area indicating the area of the region. The information processing unit 10 stores the calculated touch center position and touch area in the memory unit 20. The memory unit 20 stores touch center positions and touch areas which are calculated at predetermined time intervals.

The information processing unit 10 detects the start of flick scroll by detecting the above flick gesture. In this case, the information processing unit 10 obtains, from the memory unit 20, a largest touch area of all touch areas which have been calculated at predetermined time intervals during a period of time from when a finger touched the touch panel 40 to when the finger moved off the touch panel 40, and determines a size of the web page 100 during flick scroll based on the obtained touch area. Here, when a user desires to perform quick flick scroll, the user spontaneously touches the touch panel 40 with greater force, resulting in a larger touch area. Therefore, the size of the web page 100 during flick scroll is determined so that as the touch area increases, the size of the web page 100 is further reduced. In other words, any parameter other than the touch area may be used if the parameter can be used to detect that a user touches the touch panel 40 with greater force, or alternatively, such a parameter may be used in combination with the touch area. For example, when a user desires to perform quick flick scroll, the user performs a fast flick gesture. Therefore, a touch speed which is a change amount of a touch center position immediately before a finger moves off the touch panel 40 may be detected, and the size of the web page 100 during flick scroll may be determined so that as the detected touch speed increases, the size of the web page 100 is further reduced.

Next, the information processing unit 10 displays the web page 100 having the determined size on the display unit 30 during flick scroll. As shown in FIG. 5, the information processing unit 10 displays a size-reduced version of the entire web page 100 on the display unit 30 during flick scroll. In this case, flick scroll is controlled so that the number of pixel lines per unit time newly displayed at an end of the display unit 30 in a direction opposite to the scroll direction (an upper end of the display unit 30 when a gesture or operation is performed as shown in FIG. 4) has the same value before and after the web page 100 is reduced in size. In other words, the amount per unit time (scroll speed) of scroll on the screen of the display unit 30 is substantially not changed, irrespective of whether or not the web page 100 is reduced in size. As a result, when the web page 100 is reduced in size, a change amount of a position on the web page 100 displayed on a specific position on the screen of the display unit 30 increases without a change in the moving speed of an image forming the web page 100. In other words, when the web page 100 is reduced in size, a portion of the web page 100 that is located outside the screen of the display unit 30 can be more quickly displayed on the display unit 30 than when the web page 100 is not reduced in size. In this case, because the web page 100 is reduced in size, the vertical length of the scroll indicator 110 increases.

Next, when flick scroll is stopped, the information processing unit 10 causes the reduced size of the web page 100 to return to the original size as it was before being reduced.

Note that when flick scroll is started by a flick gesture, the web page 100 may be immediately reduced in size and displayed, or alternatively, the web page 100 may be gradually reduced in size and displayed, depending on the elapsed time from the start of flick scroll or the scroll speed. On the other hand, when flick scroll is stopped, the web page 100 may be immediately enlarged and displayed, or alternatively, the web page 100 may be gradually enlarged and displayed, depending on the elapsed time from the stoppage of flick scroll. Alternatively, the web page 100 may be gradually enlarged and displayed, depending on the scroll speed. For example, as the scroll speed decreases, the web page 100 is further enlarged and displayed.

During flick scroll, the web page 100 may be reduced in size only when a user is performing a predetermined operation on the operation unit 50.

When a user touches the touch panel 40 using a finger and slides the finger in any of up, down, left, and right directions while keeping touching the touch panel 40, the screen is scrolled by a distance corresponding to an amount by which the finger is slid (hereinafter referred to as "slide scroll"). When slide scroll is being performed, there is a possibility that the user is performing the gesture or operation while trying to understand the content of the web page 100, and therefore, the web page 100 is not reduced in size.

(Details of Displaying Process of this Embodiment)

Figure 6:
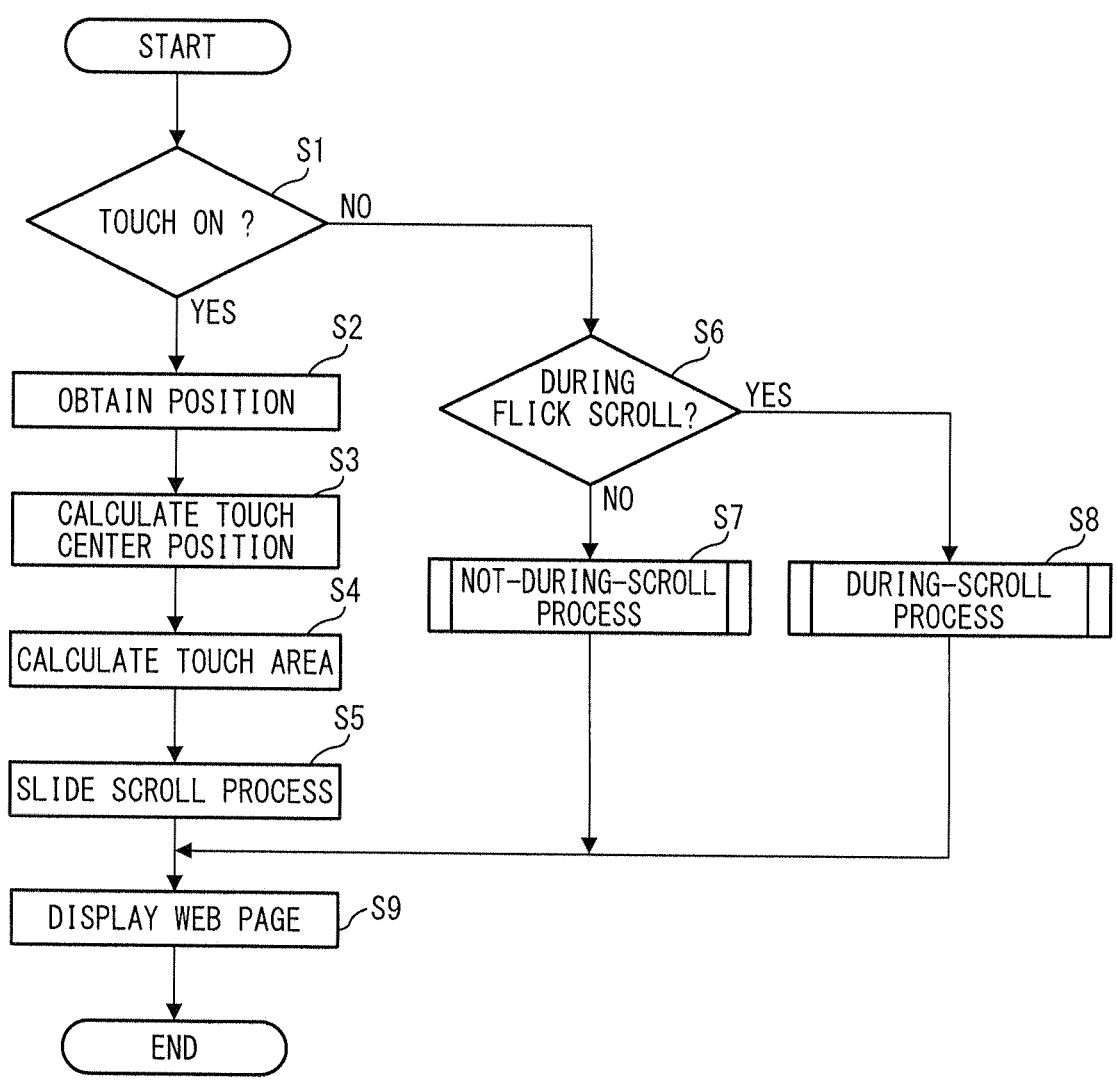
FIG. 6 is a main flowchart showing details of an example non-limiting display process.

Next, a display process will be described in detail with reference to FIG. 6. FIG. 6 is a main flowchart showing details of the display process of this embodiment. The process shown in the flowchart of FIG. 6 is performed by the information processing unit 10 executing an information processing program stored in the memory unit 20.

Initially, the information processing unit 10 determines whether or not the touch panel 40 is being touched (step S1). Specifically, the information processing unit 10 determines whether or not a position group on the screen of the display unit 30 detected by the touch panel 40 is being output from the touch panel 40. If the determination result of step S1 is positive, the information processing unit 10 obtains, from the touch panel 40, the position group on the screen of the display unit 30 detected by the touch panel 40 (step S2). In this case, the information processing unit 10 stores the obtained position group on the screen of the display unit 30 in the memory unit 20. Also, the information processing unit 10, when a flick scroll flag stored in the memory unit 20 is on, sets the flick scroll flag to be off. Note that the flick scroll flag indicates whether or not flick scroll is being performed. On the other hand, if the determination result of step S1 is negative, the process proceeds to step S6.

Next, the information processing unit 10 calculates a touch center position indicating a center position in a region of the touch panel 40 touched using a finger, based on the position group on the screen of the display unit 30 obtained from the touch panel 40 (step S3). The information processing unit 10 also calculates a touch area indicating the area of the region of the touch panel 40 touched using the finger, based on the position group on the screen of the display unit 30 obtained from the touch panel 40 (step S4). In this case, the information processing unit 10 stores the calculated touch center position and touch area in the memory unit 20. Next, the information processing unit 10 performs slide scroll on the screen of the display unit 30 based on a distance between a currently calculated touch center position and the previously calculated touch center position (step S5), and transitions to step S9. Note that if, in step S5, the currently calculated touch center position and the previously calculated touch center position are substantially the same, the information processing unit 10 does not perform slide scroll.

If the determination result of step S1 is negative, the information processing unit 10 determines whether or not the web page 100 is being scrolled by a flick gesture (step S6). Specifically, the information processing unit 10 determines whether or not the flick scroll flag stored in the memory unit 20 is on.

Figure 7:
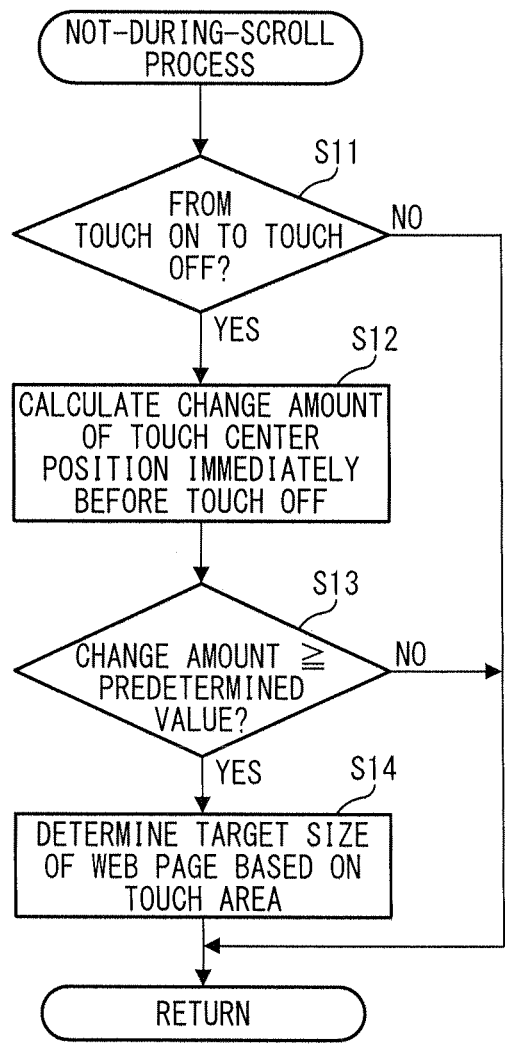
FIG. 7 is a flowchart showing an example non-limiting not-during-scroll process.

If the determination result of step S6 is negative, the information processing unit 10 performs a not-during-scroll process (step S7). The not-during-scroll process will now be described in detail. FIG. 7 is a flowchart showing the not-during-scroll process of this embodiment.

The information processing unit 10 determines whether or not the finger has moved or lifted off the touch panel 40 (from touch on to touch off) (step S11). Specifically, by referencing the memory unit 20, the information processing unit 10 determine whether or not it is true that a position group on the screen of the display unit 30 corresponding to the most recent detection event is not stored and a position group on the screen of the display unit 30 corresponding to the second most recent detection event is stored. If the determination result of step S11 is negative, the information processing unit 10 transitions to step S9 of FIG. 6.

If the determination result of step S11 is positive, the information processing unit 10 calculates a change amount of the touch center position immediately before touch off (step S12). Specifically, by referencing the memory unit 20, the information processing unit 10 calculates the change amount of the touch center position based on the most recently stored position group and another position group stored a predetermined period of time before that.

The information processing unit 10 determines whether or not the calculated change amount of the touch center position is greater than or equal to a predetermined value (step S13). If the determination result of step S13 is positive, the information processing unit 10 determines a target value of the size of the web page 100 which is to be set during flick scroll of the web page 100, based on the touch area (step S14). Specifically, by referencing the memory unit 20, the information processing unit 10 obtains a largest touch area of all touch areas that have been calculated at predetermined time intervals, and determines the target value of the size of the web page 100 which decreases with an increase in the value of the obtained touch area. For example, the memory unit 20 stores a table in which touch area ranges are associated with target values, and the information processing unit 10 determines the target value by referencing the table based on the obtained touch area. Here, the information processing unit 10 sets the flick scroll flag stored in the memory unit 20 to be on.

On the other hand, if the determination result of step S13 is negative, the information processing unit 10 transitions to step S9 of FIG. 6.

Figure 8:
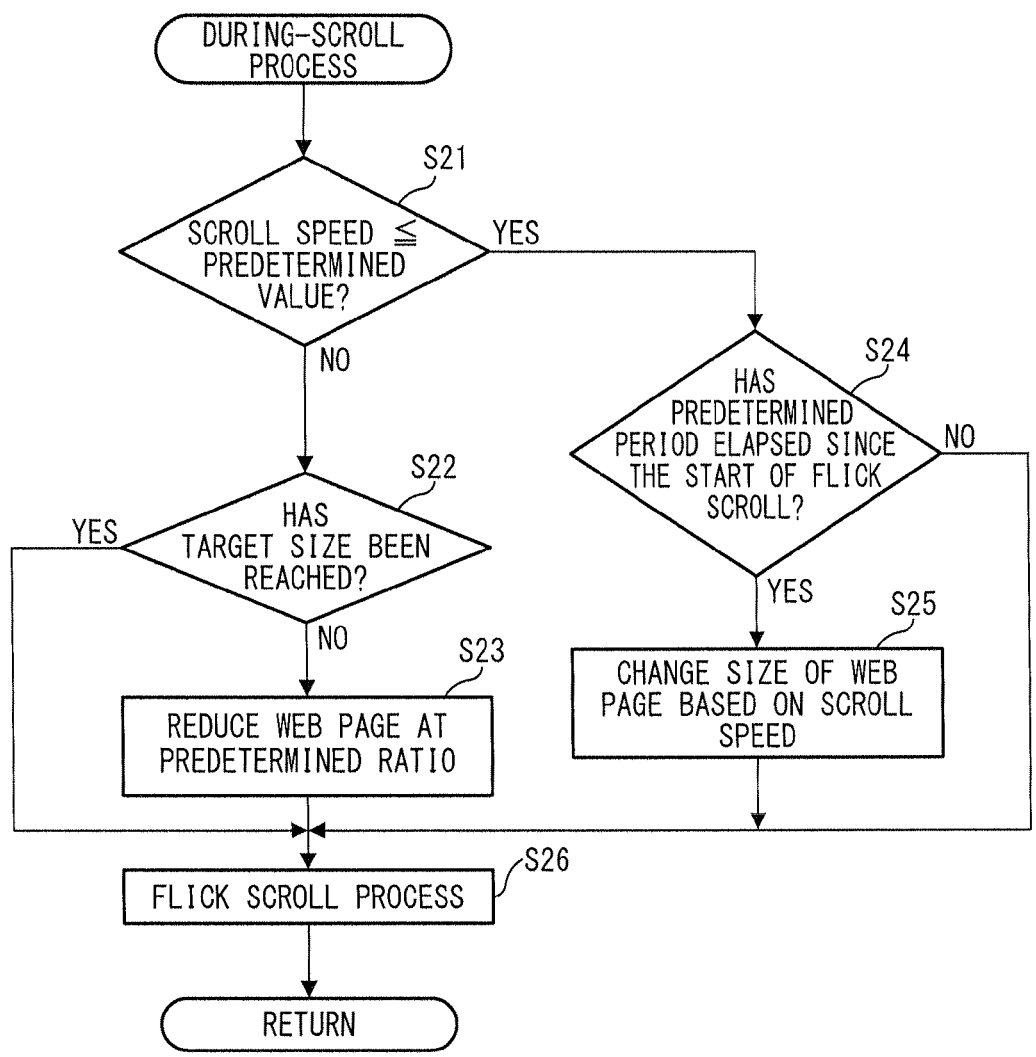
FIG. 8 is a flowchart showing an example non-limiting during-scroll process.

Referring back to FIG. 6, if the determination result of step S6 is positive, the information processing unit 10 performs a during-scroll process (step S8). The during-scroll process will now be described in detail. FIG. 8 is a flowchart showing the during-scroll process of this embodiment.

The information processing unit 10 determines whether or not the scroll speed is lower than or equal to a predetermined value (step S21). If the determination result of step S21 is negative, the information processing unit 10 determines whether or not the size of the web page 100 has reached a size indicated by the target value (step S22). If the determination result of step S22 is negative, the information processing unit 10 reduces the web page 100 in size at a predetermined ratio (step S23). If the determination result of step S22 is positive, it is not necessary to further reduce the web page 100 in size, and the process proceeds to step S26.

If the determination result of step S21 is positive, the information processing unit 10 determines whether or not a predetermined period of time has elapsed since the start of flick scroll (step S24). If the determination result of step S24 is negative, the information processing unit 10 transitions to step S26. On the other hand, if the determination result of step S24 is positive, the information processing unit 10 changes the size of the web page 100 to one that corresponds to the scroll speed (step S25), and transitions to step S26. Specifically, when the scroll speed is reduced, the information processing unit 10 increases the size of the web page 100 which has been reduced. Thereafter, when the scroll speed becomes substantially zero, the size of the web page 100 which has been reduced is returned to the original size as it was before being reduced. Next, the information processing unit 10 performs flick scroll on the screen of the display unit 30 based on the scroll speed (step S26), and transitions to step S9 of FIG. 6.

Referring back to FIG. 6, the information processing unit 10 displays the web page 100 on the display unit 30 (step S9).

As described above, in this embodiment, when flick scroll is being performed on the screen of the display unit 30, the web page 100 is reduced in size in the direction of the flick scroll, and therefore, a portion of the web page 100 that is located outside the screen of the display unit 30 can be more quickly displayed on the screen of the display unit 30. Therefore, a user is allowed to view a desired portion of the web page 100 more quickly.

(Variations)

Note that, in this embodiment, when a flick gesture is performed on the touch panel 40, the web page 100 is reduced in size and displayed based on the touch area. In another embodiment, when a slide gesture or operation is performed on the touch panel 40, the web page 100 may be reduced in size and displayed based on the touch area. Specifically, when a user of the information processing device 1 touches the touch panel 40 using a finger, and slides the finger in any of up, down, left, and right directions while keeping touching the touch panel 40, the screen of the display unit 30 is scrolled by a slide gesture based on the slide amount. Even when such a gesture is performed by a user, the web page 100 is reduced in size and displayed on the display unit 30 based on the touch area during slide scroll.

Also in this embodiment, the web page 100 is reduced in size and displayed based on the touch area. In another embodiment, the number of fingers with which a user touches the touch panel 40 may be detected based on the touch area. For example, if the number of detected fingers is one, the web page 100 displayed on the display unit 30 may not be reduced in size during flick scroll. If the number of detected fingers is two, the web page 100 displayed on the display unit 30 may be reduced in size during flick scroll.

Also in this embodiment, the size (target value) of the web page 100 during flick scroll is determined based on the touch area or the touch speed. In another embodiment, the size of the web page 100 during flick scroll may be determined based on a detected value of the acceleration sensor 80 in addition to or instead of the touch area and the touch speed. For example, a table in which the touch area ranges and the detection ranges of the acceleration sensor 80 are associated with target values may be stored in the memory unit 20, and the information processing unit 10 may determine a target value by referencing the table based on the touch area and the detection value of the acceleration sensor 80. Note that the information processing device 1 may include a pressure sensor which detects a pressure of a finger touching the touch panel 40, and the size of the web page 100 during flick scroll may be determined based on the touch area and a detection value of the pressure sensor instead of the detection value of the acceleration sensor 80.

Also in this embodiment, a single table in which the touch area ranges are associated with target values is stored in the memory unit 20. In another embodiment, a table may be prepared for each user or each predetermined group, and the tables may be stored in the memory unit 20. In this case, the correspondence relationship between the touch area ranges and the target values may vary from user to user or from group to group.

Also in this embodiment, when the screen is scrolled by a flick gesture, not only the length in the scroll direction (the vertical direction when the gesture of FIG. 4 is performed) of the web page 100 but also the length in another direction (the horizontal direction when the gesture of FIG. 4 is performed) are reduced. In another embodiment, when the screen is scrolled by a flick gesture, only the length in the scroll direction (the vertical direction when the gesture of FIG. 4 is performed) of the web page 100 may be reduced. In this case, it becomes less easy to view a document, an image, etc. in the web page 100. However, it is estimated that when a gesture or operation to reduce the web page 100 in size is performed, the content of the web page 100 is not carefully viewed, and therefore, a user's convenience is not reduced.

Also in this embodiment, when the screen is scrolled by a flick gesture, the entire web page 100 is reduced in size. In another embodiment, only a portion of the web page 100 which is displayed on the screen of the display unit 30 as a result of reduction at least at the next time may be reduced in size, leaving the other portion not reduced in size.

Also in this embodiment, a position group on the screen of the display unit 30 is detected using the touch panel 40, and the information processing unit 10 performs a predetermined information process based on the detected position group. In another embodiment, a position group on a predetermined input surface of a touch pad etc. may be detected, and the information processing unit 10 may perform the predetermined process based on the detected position group. In still another embodiment, the information processing unit 10 may perform the predetermined process based on a user's instruction input to the operation unit 50. For example, two buttons may be provided as the operation unit 50. When one of the buttons is pressed down, the screen may be only scrolled, and when the other button is pressed down, the screen may be scrolled, and in addition, the web page 100 may be simultaneously reduced in size.

Also in this embodiment, the information processing unit 10 of the information processing device 1 performs flick scroll on the screen of the display unit 30 displaying the web page 100, and during flick scroll, reduces the web page 100 in size and displays a portion of the size-reduced web page 100 on the screen of the display unit 30. In another embodiment, in an information processing system including a plurality of information processing devices, information processing units of the information processing devices may share the process. For example, the information processing unit of one information processing device may perform flick scroll on the screen of the display unit 30 displaying the web page 100 and reduce the web page 100 in size during flick scroll, while the information processing unit of another information processing device displays a portion of the size-reduced web page 100 on the screen of the display unit 30.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable recording medium storing an information processing program which causes a computer of an information processing device to execute:
    scrolling a screen of a display unit on which a portion of an entirety of content is displayed;
    reducing the entirety of the content in size so that a portion that was previously not displayed on the screen is displayed on the screen during scrolling the screen;
    displaying the at least a portion reduced in size of the content on the screen, wherein said scrolling and reducing the content in size is performed simultaneously in response to a user entering an initial input on the displayed content, but not on a scroll bar of the display unit; and
    when the input is no longer being entered, gradually returning the reduced size of the content to an original size before being reduced, in accordance with an elapsed time from the time at which the input is no longer being entered.

2. The non-transitory computer-readable recording medium of claim 1, wherein
    the screen is scrolled by a scroll amount per predetermined time on the screen, the scroll amount per predetermined time being substantially not changed, irrespective of whether or not the content is reduced in size.

3. The non-transitory computer-readable recording medium of claim 1, wherein the information processing program causes the computer to further execute:
    detecting a strength of an input performed by a user in response to the user's input, wherein
    the content is reduced in size based on a result of the strength detection.

4. The non-transitory computer-readable recording medium of claim 3, wherein the information processing program causes the computer to further execute:
    obtaining a position group on a predetermined input surface in response to the user's input, wherein
    the strength of the user's input is detected based on the obtained position group.

5. The non-transitory computer-readable recording medium of claim 4, wherein
    the content is reduced in size at a ratio which increases with an increase in the detected strength.

6. The non-transitory computer-readable recording medium of claim 4, wherein
    the screen is scrolled based on the obtained position group.

7. The non-transitory computer-readable recording medium of claim 4, wherein the information processing program causes the computer to further execute:
    calculating, based on the obtained position group, a touch area indicating an area of a touched region of the input surface, wherein
    the strength of the user's input is detected based on the touch area.

8. The non-transitory computer-readable recording medium of claim 4, wherein the information processing program causes the computer to further execute:
    calculating, based on the obtained position group, a movement speed indicating a distance per predetermined time by which a touched region of the input surface has been moved, wherein
    the strength of the user's input is detected based on the movement speed.

9. The non-transitory computer-readable recording medium of claim 1, wherein
    the screen is scrolled in response to a user's instruction to an operation unit, and
    the content is reduced in size in response to the instruction.

10. The non-transitory computer-readable recording medium of claim 1, wherein the information processing program causes the computer to further execute:
    obtaining a position group on a predetermined input surface in response to a user's input; and
    identifying a first operation in which the position group continues to be obtained and varies or a second operation in which the obtained position group varies within a predetermined period of time before being not obtained, wherein
    when the first operation is performed, the screen is scrolled based on the position group relating to the first operation, and when the second operation is performed, the screen is scrolled based on the position group relating to the second operation, and
    when the first operation is performed, the content is not reduced in size, and when the second operation is performed, the content is reduced in size.

11. The non-transitory computer-readable recording medium of claim 10, wherein
    when the second operation is performed, the content is reduced at a reduction ratio which is determined based on the position group relating to the second operation.

12. The non-transitory computer-readable recording medium of claim 11, wherein
    the reduction ratio is not changed until a predetermined period of time has elapsed since the start of the second operation.

13. The non-transitory computer-readable recording medium of claim 1, wherein
    the screen is scrolled in response to a user's scroll operation, and the content is reduced in size in response to the scroll operation.

14. An information processing method comprising:
    scrolling a screen of a display unit on which a portion of an entirety of content is displayed; reducing the entirety of the content in size so that a portion that was previously not displayed on the screen is displayed on the screen during scrolling the screen;
    displaying the at least a portion reduced in size of the content on the screen, where said scrolling and reducing the content in size is performed simultaneously in response to a user entering an initial input on the displayed content, but not on a scroll bar of the display unit; and
    when the input is no longer being entered, gradually returning the reduced size of the content to an original size before being reduced, in accordance with an elapsed time from the time at which the input is no longer being entered.

15. An information processing system comprising a plurality of information processing devices, wherein said plurality of information processing devices comprise processors configured to:
- scroll a screen of a display unit on which a portion of an entirety of content is displayed;
- reduce the entirety of the content in size so that a portion that was previously not displayed on the screen is displayed on the screen during scrolling the screen;
- display, on the screen, the at least a portion reduced in size, wherein said scrolling and reducing the content in size is performed simultaneously in response to a user entering an initial input on the displayed content, but not on a scroll bar of the display unit; and
- when the input is no longer being entered, gradually returning the reduced size of the content to an original size before being reduced, in accordance with an elapsed time from the time at which the input is no longer being entered.

16. An information processing device comprising:
a display unit, and
a processing device comprising at least on computer processor configured to:
- scroll a screen of the display unit on which a portion of an entirety of content is displayed;
- reduce the entirety of the content in size so that a portion that was previously not displayed on the screen is displayed on the screen during scrolling the screen;
- display, on the screen, the at least a portion reduced in size, wherein said scrolling and reducing the content in size is performed simultaneously in response to a user entering an initial input on the displayed content, but not on a scroll bar of the display unit; and
- when the input is no longer being entered, gradually returning the reduced size of the content to an original size before being reduced, in accordance with an elapsed time from the time at which the input is no longer being entered.

* * * * *